Feb. 15, 1966 WAY DONG WOO 3,235,855
BINARY MAGNETIC RECORDING APPARATUS
Filed Oct. 2, 1961 3 Sheets-Sheet 1

INVENTOR:
Way Dong Woo,
BY Henry L. Hanson
ATTORNEY

RECORDING CIRCUIT

INVENTOR:
Way Dong Woo,
BY Henry L. Hanson
ATTORNEY

BINARY MAGNETIC RECORDING APPARATUS

Filed Oct. 2, 1961

3 Sheets-Sheet 3

3,235,855

BINARY MAGNETIC RECORDING APPARATUS

Way Dong Woo, Newton Center, Mass., assignor to Honeywell Inc., a corporation of Delaware Filed Oct. 2, 1961, Ser. No. 142,424
6 Claims. (Cl. 340—174.1)

This invention relates generally to pulse communication systems and more particularly to a new and improved coded pulse communication system having advantageous application in the recording and playback of binary information signals on a record storage medium.

In pulse communication systems, such as telephonic or telegraphic communication systems, electronic data processing systems, and the like, the information signals may conveniently be represented in binary form wherein the signals comprise one or the other of two identifiable wave forms. Thus, it has been a common practice in the prior art to represent binary number information as electrical on-off signals, dot-dash signals, or positive-negative signals. In one known type of prior system the binary numbers have been represented as a first signal which is positive for the first half of the pulse period and negative for the second half of the pulse period together with a second signal which is a mirror image of the first signal.

Those skilled in the art also will appreciate that codes utilizing time discrimination for binary number identification have been utilized in prior data processing systems. Since, in such systems, a long pulse represents one binary digit and a short pulse represents the other binary digit, it is apparent that the lengths of different information words may vary greatly and that the length of any particular word will depend upon the number of binary ones and zeros in the word.

Manifestly, it is desirable in many instances to utilize information codes having fixed length pulse bits due to the economics of processing time and record space achieved. At the same time, it often is desirable to utilize discretely identifiable coded signals to insure accurate and efficient communcation of such coded signals in data processing systems, such as modern high speed computers and the like.

Accordingly, it is a general object of this invention to provide a new and improved coded pulse communication system having many advantages which are not attainable in prior art coded pulse communication systems.

More particularly, it is an object of this invention to provide a unique coded pulse communication system wherein binary digits are represented by fixed length bits having time discrimination identification characteristics.

In accordance with a feature of this invention, the binary one and binary zero digits in the information word are represented by electrical signal pulses of equal and fixed length such that the information word can be proccessed with predetermined handling time and record space requirements. However, the invention differs substantially from prior art fixed length bit codes in that the coded signal pulses are recorded and sensed in accordance with time discrimination techniques, thereby providing many advantages in the data processing operation.

In one particular illustrative embodiment of the invention, one of the binary digits, such as the binary zero may be represented by a signal pulse having a constant polarity for the full pulse period. The other binary digit, such as the binary one, may be reperesented by a signal pulse which is of one polarity for the first half of the pulse period and of the other polarity for the second half of the pulse period. Thus, a signal pulse may be detected and identified through the use of time discrimination techniques wherein the length of the coded signals between polarity crossovers is indicative of the binary digits comprising the information word.

As explained in greater detail hereinbelow, the invention serves to facilitate the accurate and efficient recording of the information words on a record medium, such as a magnetic tape, a magnetic drum or magnetic disc. In accordance with a feature of this invention, such recording is achieved by sensing each succeeding binary digit in the information word together with its immediately preceding binary digit. When the succeeding binary digit is a binary one, the direction of the recording current is maintained unchanged. When the succeeding binary digit is a binary zero and the preceding binary digit is a binary one, the direction of the recording current also is maintained unchanged. When the succeeding binary digit is a binary zero and the preceding binary digit is a binary zero, the direction of the recording current is reversed. It has been found that recording of the binary information word in accordance with the principles of this invention results in shorter processing time and record space requirements than those present in the use of prior art time discriminaton coded pulse techniques.

In the detection of the information word recorded on the record medium, the coded signals are sensed for polarity crossovers. One of the distinct advantages of the present invention is the fact that the minimum distance between such crossovers equals one pulse period while the maximum distance between such crossovers equals two pulse periods. This characteristic not only facilitates the sensing of the recorded information, but also provides a check on the accuracy of the recording apparatus and operation.

Another advantage of the present invention resides in its provision of a self-clocking playback arrangement. Thus, it is not necessary to carry a clock channel with the information data and clock or timing signals can be created from the data as it is read from the record medium or received over a transmission line.

Thus, it is an object of this invention to provide a new and highly useful coded pulse communication system wherein one binary digit is represented by a signal of constant polarity while the other binary digit is represented by a signal having a first polarity for the first half pulse period and a second polarity for the remainder of the pulse period.

It is another object of this invention to provide a new and improved time discrimination type of coded pulse communication system, as above, which is characterized by its relatively short processing time and record space requirements.

It is a further object of this invention to provide a novel self-clocking data processing arrangement wherein a clock channel is not required to utilize data obtained from a record medium or transmission line.

The novel features which are characteristic of the invention are set forth with particularity in the appended claims. The invention itself, however, both as to its organization and method of operation, together with further objects and advantages thereof, will best be understood by reference to the following description taken in conjunction with the accompanying drawings in which:

Figure 5A:
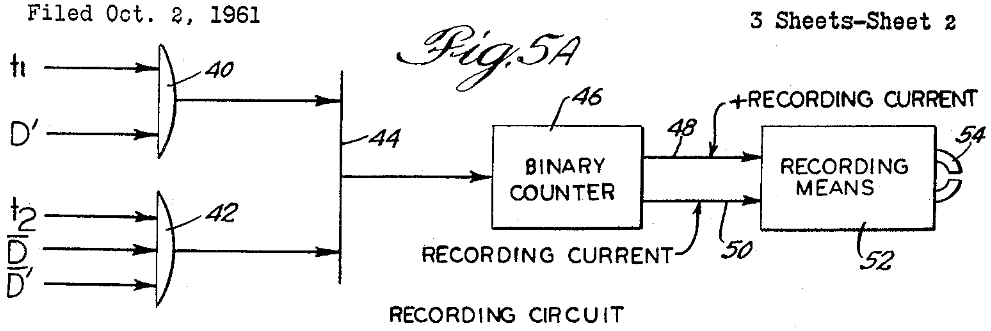
Figure 5B:
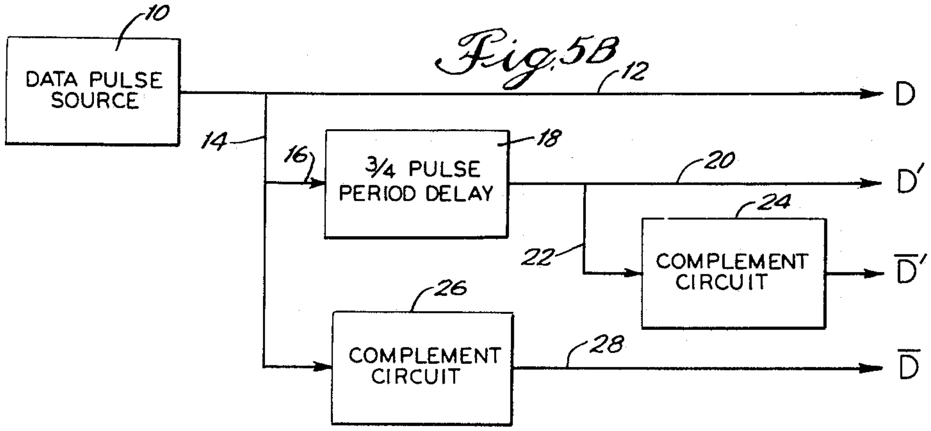
Figures 5C, 6:
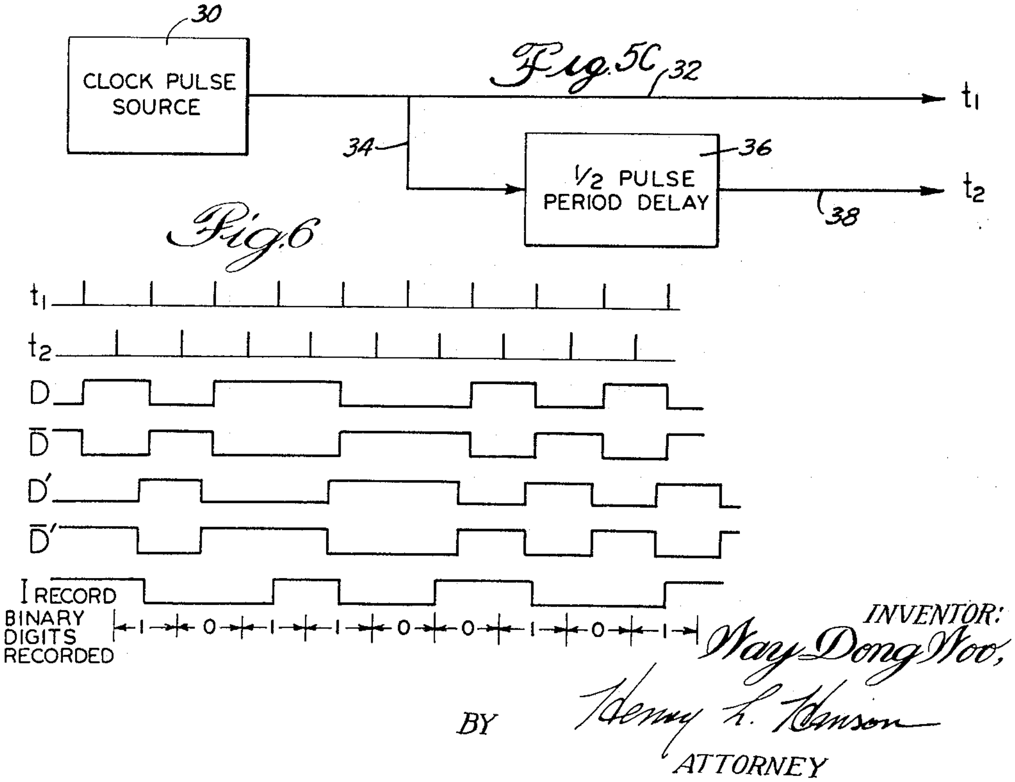
Figures 7, 8:
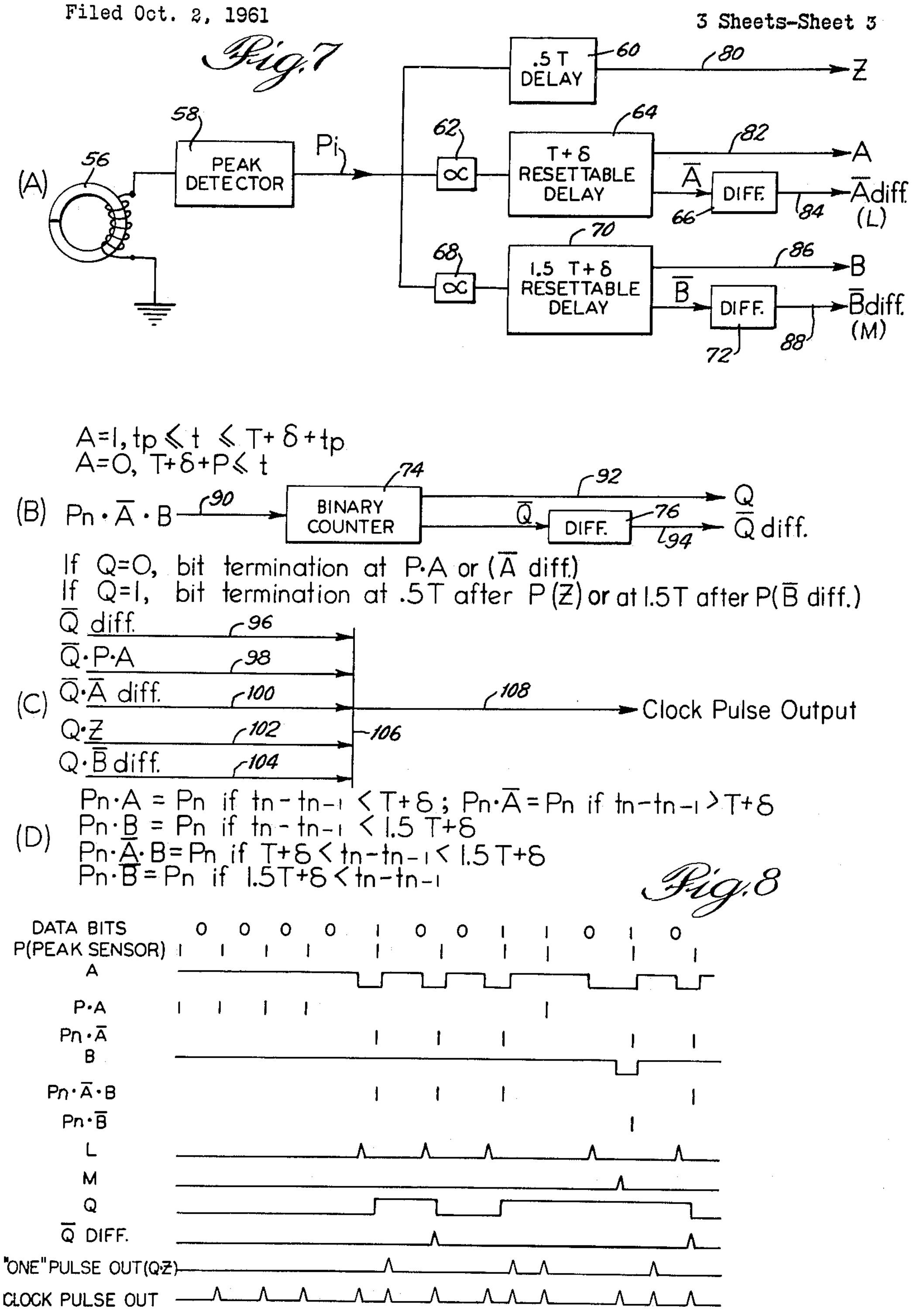

FIGURES 5A–C illustrate a schematic diagram of one embodiment of a recording circuit in accordance with the present invention;

FIGURE 6 is a wave form diagram showing illustrative timing and data signals present in the operation of the recording circuit of FIGURE 5;

FIGURE 7 illustrates the circuit of a unique self-clocking playback arrangement embodying the invention together with the logical statements associated therewith; and FIGURE 8 is a wave form diagram showing illustrative conditions and pulses which appear at various times in accordance with the data processed in the playback arrangement of FIGURE 7.

Figure 1:
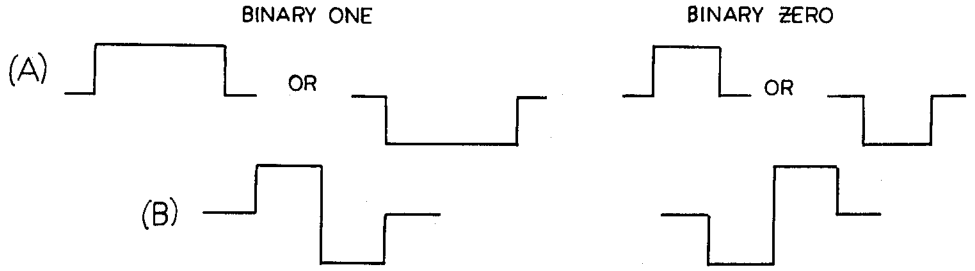
Fig. 1 PRIOR ART
FIGURE 1 illustrates various coded pulse signals utilized in certain prior art types of binary coded pulse communication systems.

Referring now to the specification, and more particularly to FIGURE 1 thereof, there is shown coded pulse signals of the type utilized in prior art binary pulse communication systems. Those skilled in the art will appreciate that the binary number system utilizes signals of two distinct wave forms to represent a binary one and a binary zero, respectively. FIGURE 1A illustrates two different types of binary one and binary zero signal wave forms as heretobefore used in time discrimination pulse communication systems. Thus, as shown in FIGURE 1A, a binary one may be represented by a pulse wave form of either polarity having a time length equal to a full pulse period and a binary zero may be represented by a pulse wave form of either polarity having a time length equal to a fractional part of a full pulse period, as for example, a one-half pulse period.

FIGURE 1B illustrates still another type of pulse wave form which is known in prior art binary pulse communication systems. As there is shown, the binary one may take the form of a pulse wave form which is of one polarity for one-half of the pulse period and of the opposite polarity for the second half of the pulse period, there being a polarity crossover at the middle of the pulse period. Conversely, the binary zero may be the mirror-image of the binary one wherein the pulse is of an opposite polarity during the first half of the pulse period and reverses to the other polarity during the second half of the pulse period. The binary wave forms shown in FIGURE 1B are of equal length and, therefore, they are identified by polarity detection apparatus in contrast to the pulse wave forms of FIGURE 1A which are identified by time discrimination detection apparatus. Each of these prior art types of primary signals have certain advantages and disadvantages which are well-known to those skilled in the pulse communication art.

In accordance with a feature of the present invention, a new and highly advantageous coded pulse system is utilized which combines the advantages of the two prior art systems shown in FIGURES 1A and 1B in that the signal wave forms are of equal length while at the same time embodying time discrimination techniques. In the specific illustrative example shown in FIGURE 2, a binary one may be represented as a signal pulse wave form is of a first polarity during the first half of the pulse period and of a second polarity during the remainder of the pulse period, there being a polarity crossover at approximately the midpoint of the pulse period. The binary zero may be represented by a signal pulse wave form which is of constant polarity during the entire pulse period, there being no polarity crossover between the beginning and end of the pulse period. It can now be appreciated that the binary one and binary zero signal wave forms are of equal lengths and the binary digits represented thereby may be identified by time discrimination techniques in sensing the presence or absence of a polarity crossover during the pulse period. Thus, during the use of the novel coded signal pulses taught by the present invention, an information word may be a fixed predetermined length to provide shorter processing time and record space requirements than those present with prior art time discrimination coded pulse techniques.

FIGURE 3A represents the signal pulse wave form having a train of binary zeros in accordance with the present invention. As there shown, the first binary zero may take the form of a positive pulse for the entire pulse period, the second binary zero may take the form of a negative pulse for the entire pulse period and so on with each succeeding binary zero having a constant polarity during the entire pulse period but differing in polarity from the immediately preceding and immediately succeeding binary zero signal pulses.

FIGURE 3B illustrates the pulse wave form of a train of binary ones in accordance with the present invention. As there shown, the first binary one digit may take the form of a signal pulse which is positive for the first half pulse period and negative for the second half pulse period with a polarity crossover at approximately the middle of the pulse period. The second binary one may take the form of a signal pulse which is negative for the first half pulse period and positive for the second half of the pulse period with a polarity crossover at approximately the middle of the pulse period. It can be seen that each succeeding binary one takes this particular wave form with each binary one starting with the same polarity as the perceding binary one and ending with the same binary polarity as the succeeding binary one.

Figures 3, 4:
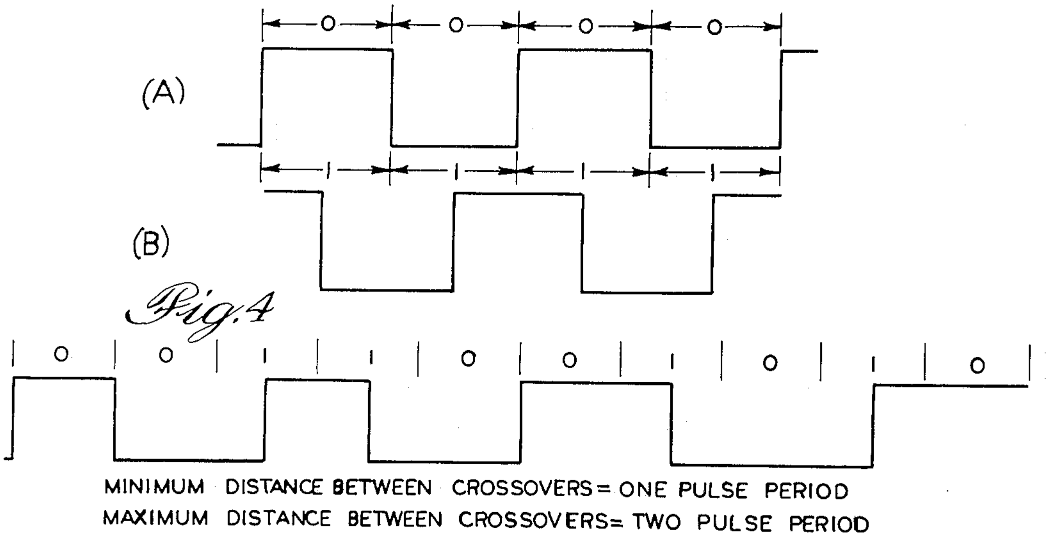
FIGURE 3 illustrates coded puse signals representing a plurality of binary zeros and binary ones, respectively, in accordane with the present invention.
FIGURE 4 is an illustrative wave form of an information word comprising binary coded signals in accordance with the present invention.

FIGURE 4 illustrates the wave form of an exemplary information word comprised of the binary digits 0011001010. In accordance with the discretely identifiable wave forms for the binary ones and binary zeros, as discussed above, the signal wave form for this particular illustrative information word can be seen to be of the same over-all length as another information word containing the same number of binary digits even though the information word may comprise binary digits in any other and different order. One of the unique characteristics of the present invention now can be appreciated in that regardless of the binary digits comprising the information word, the minimum distance between polarity crossovers is equal to one pulse period while the maximum distance between polarity crossovers is equal to two pulse periods. This fact can advantageously be utilized in the processing of information words recorded in accordance with the invention and it also provides an efficient check on the accuracy of the recording apparatus and operation.

An illustrative embodiment of a recording circuit for recording information words in accordance with the present invention is shown in FIGURE 5 of the drawing. This recording circuit, which is merely representative of one type of recording circuit which may be used, is adapted to operate in accordance with the following rules which are particularly characteristic of the present invention:

(1) If at the beginning of each pulse period, the new binary digit is sensed to be a binary one, the direction of the recording current is maintained and is not changed by the recording circuit until the binary one polarity crossover at approximately the middle of the pulse period.

(2) If at the beginning of each pulse period, the new binary digit is sensed to be a binary zero, and the immediately preceding binary digit is sensed to be a binary one, the direction of the recording current is maintained and is not changed by the recording circuit for the duration of the pulse period.

(3) If at the beginning of each pulse period, the new binary digit is sensed to be a binary zero, and the immediately preceding binary digit is sensed to be a binary zero, the direction of the recording current is changed by the recording circuit to record a single pulse of opposite polarity for the duration of the pulse period.

The illustrative recording circuit of FIGURE 5 is well adapted to provide recording of the information word upon a suitable recording medium such as a magnetic tape in accordance with the rules set forth above. The operation of the FIGURE 5 recording circuit is illustratively described hereinbelow and the various timing and data signals recited are shown in the accompanying wave form diagram of FIGURE 6.

The recording circuit of FIGURE 5 comprises, as shown in FIGURE 5B, a data pulse source 10 which may take the form of any suitable data processing apparatus capable of supplying information signals in binary pulse form. These data pulse signals from the source 10 are supplied directly to an output line 12, and the data pulse signals thereon may be identified by the symbol D, also shown in FIGURE 6. In addition, the data pulse signal D from the source 10 may be applied through the signal transmission lines 14 and 16 to a ¾ pulse period delay circuit 18 of any type well-known in the art. For example, the ¾ pulse period delay 18 may take the form of a counting chain, a delay line, a rotating drum, a delay multivibrator, or the like. The output of the ¾ pulse period delay 18 is applied over the signal transmission line 20 to be utilized as described in greater detail hereinbelow wherein such delayed signals are identified by the symbol D′, as shown in FIGURE 6.

In addition, as shown in FIGURE 5B, the ¾ pulse period delay signals D′ are applied over the signal transmission line 22 to a complement circuit 24 which serves to provide a binary one output pulse when a binary zero pulse is present at its input, and conversely, a binary zero pulse at its output when a binary one pulse is present at its input. Such complement circuits are well-known in the art, and may take any suitable form such as a gate circuit. The output of the complement circuit 24 may, in accordance with well-known techniques, be identified as $\overline{D'}$, further shown in FIGURE 6.

In addition, the output of the data pulse source 10 is applied over the signal transmission line 14 to a complement circuit 26 which is similar in operation to the complement circuit 24 in that the complement of the input pulse is provided at the output of the circuit. Since the input pulses for the complement circuit 26 are identified as D, the output of the complement circuit 26 over the signal transmission line 28 may be identified as $\overline{D}$, further shown in FIGURE 6.

FIGURE 5C illustrates one type of timing or clock circuit for providing the necessary clock pulses utilized in the invention. The clock pulse source 30 is conventional and may comprise any form of timing clock well-known in the art such as an oscillator ring, a counting chain, a tapped delay line, and the like. The clock pulses at the output of the clock pulse source 30 are provided over the signal transmission line 32, in the manner described hereinbelow, and are identified as $t_1$, also shown in FIGURE 6. In addition, the output of the clock pulse source 30 is applied over the signal transmission line 34 to a ½ pulse period delay circuit 36 which serves to delay each of the clock pulses for ½ of the pulse period. The delayed clock pulses are applied over the signal transmission line 38 and are identified as $t_2$, also shown in FIGURE 6.

The recording circuit for coding the data pulses in accordance with the invention is shown in FIGURE 5A of the drawing. The various inputs to the recording circuit, such as the $\overline{D}$, D′, $\overline{D'}$, $t_1$, and $t_2$, pulses, are derived as explained hereinabove and as illustrated in the circuits of 5B and 5C.

It can be seen that the $t_1$ and D′ signal pulses are applied to a siutable AND circuit 40 which serves to provide an output only when there is a coincidence of signal pulses at its input. In a similar fashion, the $t_2$, $\overline{D}$, and $\overline{D'}$ signal pulses are applied to the AND circuit 42 which serves to provide an output only when there is a coincidence of pulses on all of its input lines. Those skilled in the art will readily appreciate that the logic circiutry illustrated in FIGURE 5A serves to provide signal wave forms in accordance with the three rules of coded pulse recording described hereinabove as a characteristic feature of the present invention. When there is a signal output from the AND circuit 40 or from the AND circuit 42, these signal outputs are transmitted through the buffer 44 to a binary counter 46. The binary counter is adapted to be switched from one stable state of operation to the other each time a signal pulse appears at its input in response to the operation of the AND circuits 40 or 42.

The output of the binary counter comprises a pair of recording current lines 48 and 50, with recording current line 48 being adapted to provide positive recording current to a recording means 52 and with the recording current line 50 being adapted to supply a negative recording current to the recording means 52. The recording means 52 may be a conventional magnetic transducer head energizing circuit which serves to energize the magnetic transducer head 54 to record codded signal pulses on a magnetic recording medium in accordance with the activation of the recording current lines 48 and 50 by the binary counter 46.

FIGURE 6 illustrates the various timing and data signals present in the FIGURE 5 circuit for the recording of an information word comprised of the binary digits 101100101. As there shown, the input binary digits D are processed by the logic elements described above, in accordance with the rules set forth heretofore, to provide a current I record, for the recording means 52. It can be seen that the incoming information data, originally presented in accordance with the polarity dicrimination technique has been recorded by the recording means in accordance with the polarity-time discrimination arrangement of the present invention.

Although the logic recording circuit of FIGURE 5A has proved very effective and efficient to provide recording of coded information pulses in accordance with the invention upon a high speed magnetic tape, it will be understood by those skilled in the art that other types of recording circuits may be used with equally advantageous results to provide recording of coded signal pulses within the principles of the present invention.

One type of playback circuit which may be used for the recovery of the coded signal pulses is illustrated in FIGURE 7 of the drawing. This playback circuit is characterized by its self-clocking feature in that a clock channel is not required to utilize data coming from the record medium or the transmission source. Rather, the circuit arrangement enables the timing for decoding to be derived directly from the incoming information data. While the playback circuit obviously lends itself to the recovery of coded signal pulses from a record medium or from a transmission line, as in the case of telegraphic information, for purposes of illustration the circuit will be described as constituted for use with a magnetic record medium.

A suitable magnetic transducer 56 is adapted to be positioned adjacent the data channel of the magnetic record medium to sense the coded signal pulses recorded thereon. These sensed coded signal pulses advantageously are transmitted, either directly or through a suitable amplifier, to a peak or crossover detector 58 which serves to determine the point at which the sensed coded signals croosover from one polarity to the other. In accordance with a well-known operation of such crossover detector circuits, a signal pulse output is provided from crossover detector 58 in phase with this polarity crossover point, which occurs in the practice of this invention between adjacent zero binary digits and at approximately the center point of one binary digit.

While the crossover detector 58 has not been shown in detail, since such details are known in the art, an illustrative crossover detector circuit which advantageously may be used in the invention is shown and described in my copending application, case No. 59,213, filed December 16, 1960 and given Serial No. 76,351.

A waveform diagram of the pulses present in an illustrative operation of the FIGURE 7 playback circuit is shown in FIGURE 8 of the drawing. If in this example the data bits processed are sensed as the binary digits 000010011010, then the output of the peak detector 58 is as shown on the waveform line $P_i$ (peak sensor). It can there be seen that the peak sensor or detector 58 indicates a polarity crossover between adjacent zero digits and intermediate the pulse period of each one digit. In addition, those skilled in the art will appreciate that the processing can be started with a series of zero bits, as shown in FIGURE 8. The presence of a one bit folowing the series of zero bits serves to define the start point for the incoming data.

Figure 2:
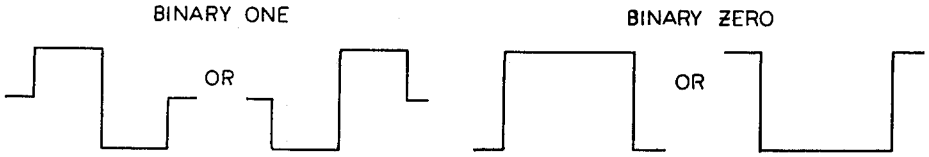
FIGURE 2 illustrates the types of binary coded pulse signals used in the present invention.

The signals $P_i$, which are the informational pulses produced by the peak detector 58, are applied to the inputs of three separate channels in the playback circuit. The first channel comprises a fixed delay circuit 60, of any suitable construction, which serves to delay each $P_i$ pulse by one-half of a timing period T. Conveniently, the timing period T is the time between zero pulses or the time of the cell length as shown in FIGURE 2 of the drawing. The output of the delay circuit 60 is applied to the line 80 and is identified as the Z output.

The second channel comprises a fixed delay circuit 62 and a resettable delay circuit 64. Delay circuit 62 delays the input pulse $P_i$ by an amount $\alpha$, which advantageously is equal to the time duration of the input pulse $P_i$ to avoid any possible pulse splitting situation. The resettable delay circuit 64 delays the output of delay circuit 62 by an amount equal to the timing period T plus an additional increment $\delta$. Those skilled in the art can now appreciate that as long as a series of binary one signals are coming in, the resettable delay 64, also known as an A circuit, will remain set. The resettable delay, or A, circuit may take any suitable form known in the art for effecting this function, as for example a one-shot multivibrator or the like.

Advantageously, the resettable delay circuit 64 is provided with both assertion and negation outputs, as shown in FIGURE 7A. The assertion output is connected to the transmission line 82 and is identified as the A output. The negation output, identified as the $\overline{A}$ output, is connected to a differentiator circuit 66 where the signal is differentiated and applied to the transmission line 84 as the $\overline{A}_{diff.}$ or L output.

The third channel connected to the output of the peak detector 58 comprises a fixed delay circuit 68 which, like the delay circuit 62 in the second channel, serves to delay the input pulse $P_i$ by an amount $\alpha$ equal to the time duration of the input pulse to avoid any possible pulse splitting situation. The output of delay circuit 68 is applied to a resettable delay circuit 70 which delays the signal pulse by an amount equal to one and one-half timing periods, 1.5T, plus an additional increment $\delta$. Thus, as long as a series of binary one signals are coming in, the resettable delay circuit 70, also known as a B circuit, will remain set. The resettable delay circuit 70 may take the form of a one-shot multivibrator, or the like, having both assertion and negation outputs. The assertion output is connected to the transmission line 86 and is identified as the B output. The negation output, identified as the $\overline{B}$ output, is connected to a differentiator circuit 72 having an output on the line 88 identified as the $\overline{B}_{diff.}$ or M output.

The logical statements shown at FIGURE 7D represent the various timing and distribution of the logic for providing the pulses needed to give the logic set forth at FIGURE 7C. Those skilled in the art will appreciate that the selection of the particular function to be activated is dependent upon the setting of the A and B circuits shown in FIGURE 7A as the respective input pulses $P_i$ are applied thereto.

An additional circuit, identified as the Q circuit advantageously is used to keep track of the pulse condition existent with the playback circuit. An illustrative Q circuit is shown in FIGURE 7B, and conveniently comprises a binary counter 74, which is a circuit having two stable states of operation as is well understood in the art. The input line 90 to the binary counter has the $P_n$, $\overline{A}$ and B signals applied thereon. The output of binary counter 74 comprises an assertion line 92 over which the signal Q is provided, and a negation line over which the signal $\overline{Q}$ is applied to a differentiating circuit 76. The output of the differentiating circuit 76 is applied to the line 94 as the signal $\overline{Q}_{diff.}$ In the operation of the Q circuit, the first $P_n \cdot \overline{A} \cdot B$ signals will operate the binary counter 74 so that Q is given a value of 1. As shown in FIGURE 7B, if $Q=0$, the signal bit terminates at $P \cdot A$ or L. If $Q=1$, the signal bit terminates at .5T after P or Z, and at 1.5T after P or M. This serves to supervise or keep track of the pulse condition within the circuit.

FIGURE 7C illustrates the logical statement required for defining the bit positions of the pulses being transferred in. As there shown, the $\overline{Q}_{diff.}$ signal from line 94 is applied on line 96 to a buffer 106. Also applied to the buffer 106 are the signals $\overline{Q} \cdot P \cdot A$ on line 98, the signals $\overline{Q} \cdot \overline{A}_{diff.}$ on line 100, the signals $Q \cdot Z$ on line 102 and the signals $Q \cdot \overline{B}_{diff.}$ on line 104. Once the bit position is defined by this circuit, the presence of a pulse which occurs upon the simultaneous appearance of the Q and Z signals will produce a one pulse signal on line 108. If both Q and Z are not present upon the occurrence of the bit position pulse, a zero will be considered as represented at that particular instant.

The understanding of the operation of the playback circuit is facilitated by the wave form diagram shown in FIGURE 8 of the drawing. As there shown, a pulse output is provided by the peak sensor between adjacent zero bits and at approximately the mid-point of a one bit, as described hereinabove. An A signal is provided by the resettable delay circuit 64 except at those times when a $P_i$ pulse output is not provided by the peak sensor, since the resettable delay circuit is maintained in its set position as long as a series of pulses is applied thereto. The $P_n \cdot A$ signal line therefore shows a pulse where there is a coincidence of $P_i$ signals and A signals. Also, the $P_n \cdot \overline{A}$ signal line shows a pulse where there is a coincidence of $P_i$ signals and the negation of A signals.

The B signal line provides a B signal except when there is a spacing between adjacent $P_i$ signals equals to two cell spaces, due to the greater delay of the delay circuit 70. At other times, the resettable delay circuit 70 is maintained in its set condition. The $P_n \cdot \overline{A} \cdot \overline{B}$ signal line shows a pulse where there is a coincidence $P_i$ signals, $\overline{A}$ signals, and B signals, while the $P_n \cdot \overline{B}$ signal line shows a pulse at the one place where there is a coincidence of $P_i$ signal and the negation of the B signal.

The L and M signals represent the outputs of the $\overline{A}$ differentiator circuit 66 and the $\overline{B}$ differentiator circuit 72, respectively. The Q and $\overline{Q}_{diff.}$ outputs of the binary counter circuit 74 is shown at the last two lines of the FIGURE 8 waveform diagram. Thus, the conditions and pulses shown in the illustrative waveform diagram of FIGURE 8 for the playback of the binary digits 000010011010 represent the signals in the playback circuit at various times in accordance with the processing of this exemplary data. The recovery of the coded data has been achieved without the necessity of a clock channel since self-clocking is provided by the logical elements which provide the time discrimination functions required for determining the digital contents of the coded pulses received by the playback circuit.

While there has been shown and described several specific embodiments of the present invention, it will, of course, be understood that various modifications and alternative constructions may be made without departing from the true spirit and scope of the invention. Therefore, it is intended by the appended claims to cover all such modifications and alternative constructions as fall within their true spirit and scope.

What is claimed as the invention is:

1. The improvement of a coded pulse data processing system for processing binary digit pulses characterized by discretely identifiable signal representations of equal time durations comprising a source of information data for supplying a train of binary digit signals, logic means for sensing each binary digit signal in said train, recording control means having two stable states of operation, said recording control means being connected to the output of said logic means such that the polarity of the recorded signal remains unchanged for at least one pulse period whenever a binary zero is sensed in the data signal train and the polarity of the recorded signal is changed at approximately the middle of the pulse period whenever a binary one is sensed in the data signal train, and playback means operative to recover the recorded signals by sensing the presence or absence of a polarity crossover at the beginning, end and approximately mid-point of each signal pulse period.

2. The improvement of a coded pulse data processing system in accordance with claim 1 wherein said playback means comprises a crossover detector adapted to provide an output pulse whenever a polarity crossover is detected in the recorded signal pulses.

3. The improvement of a coded pulse data processing system for processing binary digit pulses characterized by discretely identifiable signal representations of equal time durations comprising a source of information data for supplying a train of binary digit signals, logic means for sensing each binary digit signal in said train, recording control means having two stable states of operation, said recording control means being connected to the output of said logic means such that the polarity of the recorded signal remains unchanged for at least one pulse period whenever a binary zero is sensed in the data signal train and the polarity of the recorded signal is changed at approximately the middle of the pulse period whenever a binary one is sensed in the data signal train, and self-clocking playback means operative to recover the recorded signals by sensing the presence or absence of a polarity cross-over at the beginning, end and approximately mid-point of each signal pulse period, said self-clocking playback means including means for deriving clock signals from the coded pulse data as it is sensed from the record medium.

4. The improvement of a coded pulse data processing system for processing binary digit pulses characterized by discretely identifiable signal representation of equal time durations comprising a source of information data for supplying a train of binary digit signals, logic means for sensing each binary digit signal in said train, transmission control means having two stable states of operation, said transmission control means being connected to the output of said logic means such that the polarity of the transmitted signal remains unchanged for at least one pulse period whenever a binary zero is sensed in the data signal train and the polarity of the recorded signal is changed at approximately the middle of the pulse period whenever a binary one is sensed in the data signal train, and self-clocking receiver means operative to recover the transmitted signals by sensing the presence or absence of a polarity crossover at the beginning, end and approximately mid-point of each signal pulse period, said self-clocking receiver means including logic means for deriving clock signals from the coded pulse data after it is received by the receiver means.

5. The improvement of a coded pulse data processing system in accordance with claim 4 wherein said self-clocking receiver means comprises a peak detector for determining the point at which the sensed coded signals cross-over from one polarity to the other, and logic means connected to the output of said peak detector and including said means for deriving clock signals from the coded pulse data operative to provide output signals representative of said binary digits.

6. The improvement of coded pulse data processing apparatus for recording binary digit pulses characterized by discretely identifiable signal representations of equal time durations comprising a source of information data for supplying a train of binary digit signals, logic means for sensing each binary digit signal in said train together with its immediately preceding binary digit signal, said logic means comprising a first AND circuit adapted to receive clock signals, complemented binary digit signals and delayed complemented binary digit signals and a second AND circuit adapted to receive delayed clock signals and delayed binary digit signals, a binary counter having two stable states of operation, said binary counter being connected to the output of said logic means such that the stable state of the binary counter remains unchanged whenever a binary one is sensed in the data signal train or whenever a binary zero is sensed in the data signal train and is preceded by a binary one, and the stable state of the binary counter is changed to the other stable state of operation whenever a binary zero is sensed in the data signal train and is preceded by a binary zero, and magnetic recording means connected to the output of said binary counter for receiving recording current of one polarity when the binary counter is in one stable state of operation and recording current of opposite polarity when the binary counter is changed to said other stable state of operation.

References Cited by the Examiner

UNITED STATES PATENTS

| | | | |
|---|---|---|---|
| 2,704,361 | 3/1955 | Pouliart et al. | 340—174.1 |
| 2,807,004 | 9/1957 | Pouliart et al. | 340—174.1 |

IRVING L. SRAGOW, *Primary Examiner.*